(12) United States Patent
Wildermuth et al.

(10) Patent No.: US 12,104,960 B2
(45) Date of Patent: Oct. 1, 2024

(54) APPARATUS FOR HOT SPOT SENSING

(71) Applicant: ABB Schweiz AG, Baden (CH)

(72) Inventors: Stephan Wildermuth, Laudenbach (DE); Holger Kaul, Mannheim (DE); Tomas Kozel, Brno (CZ); Aydin Boyaci, Karlsruhe (DE)

(73) Assignee: ABB Schweiz AG, Baden (CH)

( * ) Notice: Subject to any disclaimer, the term of this patent is extended or adjusted under 35 U.S.C. 154(b) by 405 days.

(21) Appl. No.: 17/483,834

(22) Filed: Sep. 24, 2021

(65) Prior Publication Data

US 2022/0011164 A1 Jan. 13, 2022

Related U.S. Application Data

(63) Continuation of application No. PCT/EP2020/057835, filed on Mar. 20, 2020.

(30) Foreign Application Priority Data

Mar. 26, 2019 (EP) ..................................... 19165287

(51) Int. Cl.
*G01J 5/00* (2022.01)
*G01J 5/80* (2022.01)
*H04N 5/33* (2023.01)

(52) U.S. Cl.
CPC .............. *G01J 5/0066* (2013.01); *H04N 5/33* (2013.01); *G01J 2005/0077* (2013.01); *G01J 2005/0092* (2013.01); *G01J 5/80* (2022.01)

(58) Field of Classification Search
CPC .... G01J 5/0066; G01J 5/80; G01J 2005/0077; G01J 2005/0092; H04N 5/33;
(Continued)

(56) References Cited

U.S. PATENT DOCUMENTS 7,661,876 B2 * 2/2010 Liebmann ............... G01J 5/532
374/2
2009/0050806 A1 * 2/2009 Schmidt ............... H04N 23/671
250/332
(Continued)

FOREIGN PATENT DOCUMENTS

CN 108700470 A 10/2018
EP 2280460 A1 * 2/2011 ............... H02B 1/56
(Continued)

OTHER PUBLICATIONS

European Patent Office, Extended European Search Report in European Patent Application No. 19165287.4, 7 pp. (Jul. 3, 2019).
(Continued)

*Primary Examiner* — Brandi N Hopkins
*Assistant Examiner* — Janice M Soto
(74) *Attorney, Agent, or Firm* — Leydig, Voit & Mayer, Ltd.

(57) ABSTRACT

An apparatus for hot spot sensing where the apparatus includes an input unit, a processing unit, and an output unit. The input unit is configured to provide the processing unit with an image of an object that includes a hot spot. The image data of the image includes image data of the hot spot where the image was acquired by a camera. The processing unit is configured to determine a number of pixels in the image corresponding to a size of the hot spot, an average temperature for the hot spot, the determination comprising utilization of pixel values of the pixels in the image corresponding to the size of the hot spot and the number of pixels in the image corresponding to the size of the hot spot, a surrounding temperature in the image, and a corrected temperature for the hot spot.

26 Claims, 8 Drawing Sheets

(58) Field of Classification Search
CPC . G06T 2207/10048; G06T 7/11; G06T 7/136; G06T 7/194; G06T 7/62; G06T 7/0004

See application file for complete search history.

(56) References Cited

U.S. PATENT DOCUMENTS

| | | |
|---|---|---|
| 2012/0262583 A1 | 10/2012 | Bernal et al. |
| 2013/0306851 A1 | 11/2013 | Le Noc et al. |
| 2016/0334284 A1* | 11/2016 | Kaplun Mucharrafille ................ G01K 15/00 |
| 2018/0283953 A1 | 10/2018 | Frank et al. |

FOREIGN PATENT DOCUMENTS

| | | | |
|---|---|---|---|
| WO | WO-2013108955 A1 * | 7/2013 | ........... G06T 3/4007 |
| WO | 2017/100702 A2 | 6/2017 | |
| WO | 2018/002862 A1 | 1/2018 | |

OTHER PUBLICATIONS

European Patent Office, International Preliminary Report on Patentability in International Patent Application No. PCT/EP2020/057835, 7 pp. (Sep. 28, 2021).

European Patent Office, International Search Report in International Patent Application No. PCT/EP2020/057835, 3 pp. (May 4, 2020).

European Patent Office, Written Opinion in International Patent Application No. PCT/EP2020/057835, 6 pp. (May 4, 2020).

Dhimish et al., "Output-Power Enhancement for Hot Spotted Polycrystalline Photovoltaic Solar Cells," *IEEE Transactions on Device and Materials Reliability*, 18(1): 8 pp. (Mar. 31, 2018).

Tang et al., "Temperature On-Line Monitoring Device of Substation," *J. of Shanghai University of Electric Power*, 26(5): 4 pp. (Oct. 15, 2010).

The Patent Office of the People's Republic of China, Office Action in Chinese Patent Application No. 202080024274.8, 14 pp. (Jun. 12, 2024).

\* cited by examiner

Measurement errors against number N of hot spot pixels and correction function, here as a linear function from a curve fitting. The various colors represent measurements with different hot spot and background temperatures.

APPARATUS FOR HOT SPOT SENSING

CROSS-REFERENCE TO PRIOR APPLICATIONS

This application is a continuation of International Patent Application No. PCT/EP2020/057835, filed on Mar. 20, 2020, which claims priority to European Patent Application No. EP 19165287.4, filed on Mar. 26, 2019. The entire disclosure of both applications is hereby incorporated by reference herein.

FIELD

One or more embodiments of the present disclosure may relate to an apparatus for hot spot sensing, a system for hot spot sensing, a low voltage, medium voltage or high voltage switchgear comprising such a system, and/or to a method for hot spot sensing.

BACKGROUND

Infrared (IR) thermography (IRT), thermal imaging, and thermal video are examples of IR imaging science. Thermographic cameras usually detect radiation in the long-IR range of the electromagnetic spectrum (roughly 9,000-14,000 nanometers or 9-14 μm) and produce images of that radiation, called thermograms. Since IR radiation is emitted by all objects with a temperature above absolute zero according to the black body radiation law, thermography makes it possible to see an environment with or without visible illumination. The amount of radiation emitted by an object increases with temperature; therefore, thermography allows to see variations in temperature to be observed and also enables absolute temperatures to be determined from an assumption of an emissivity of a surface of an object.

Infrared thermography is widely used for contactless temperature monitoring of hot spots in electrical equipment. High resolution IR cameras are typically applied for sporadic manual inspection and give a sufficiently precise absolute temperature value. Such high resolution cameras are too expensive to be permanently installed for online temperature monitoring in electrical equipment as, for example, the detection of critical hot spots to prevent overheating in switchgears. Low resolution infrared cameras, are at a price range that could find utility for this task, however do have limited image quality. In fact accuracy of the measured temperatures for hot spots is reduced and the accuracy of the size of the hot spot cannot be accurately determined.

There is a need to address this issue.

SUMMARY

In an embodiment, the present invention provides

Therefore, it would be advantageous to have an improved technique to determine the size and temperature of hot spots in electrical equipment, such as low voltage, medium voltage and high voltage switchgear.

An object of the present disclosure may be solved with the subject matter of the independent claims, wherein further embodiments may be incorporated in the dependent claims.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
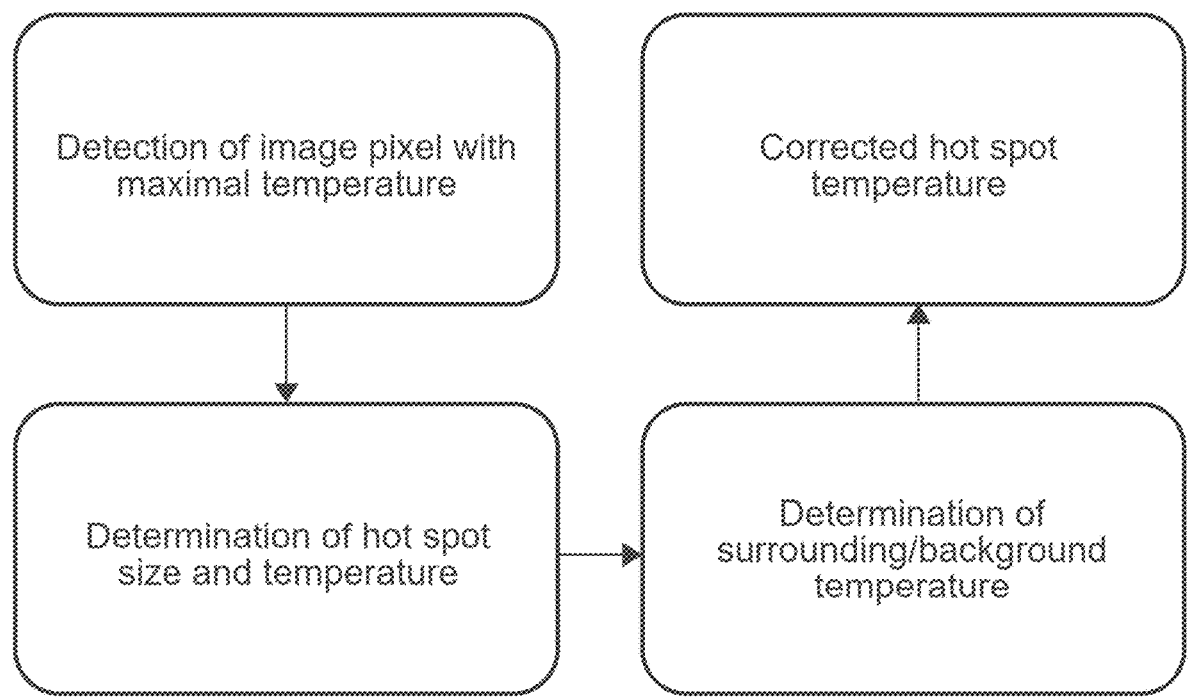
FIG. 1 shows a detailed workflow of the utilization of an examples of an apparatus, a system, and a method for hot spot sensing.

In a first aspect, there is provided an apparatus for hot spot sensing, the apparatus comprising:

an input unit;
a processing unit; and
an output unit;

The input unit is configured to provide the processing unit with an image of an object that has a hot spot. Image data of the image comprises image data of the hot spot, and the image was acquired by a camera. The processing unit is configured to determine a number of pixels in the image corresponding to a size of the hot spot. The processing unit is configured to determine the maximal temperature and an average temperature for the hot spot. The determination of the average temperature comprises utilization of pixel values of the pixels in the image corresponding to the size of the hot spot and comprises utilization of the number of pixels in the image corresponding to the size of the hot spot. The processing unit is configured to determine a surrounding temperature in the image. The determination of the surrounding temperature comprises utilization of at least one pixel in the image different to the pixels in the image corresponding to the size of the hot spot. The processing unit is configured to determine a corrected temperature for the hot spot. The determination of the corrected temperature comprises utilization of a value of a correction factor, comprises utilization of the average temperature for the hot spot and comprises utilization of the surrounding temperature.

In this manner, a low resolution camera can be used to monitor hot spot temperatures of electrical equipment. To put this another way, the apparatus increases the accuracy of low resolution IR cameras for hot spot temperature monitoring of electrical equipment.

In an example, the processing unit is configured to determine a pixel in the image corresponding to a maximum temperature of the hot spot. The pixels in the image corresponding to the size of the hot spot comprises the pixel in the image corresponding to the maximum temperature of the hot spot.

In an example, the processing unit is configured to determine the pixels in the image corresponding to the size of the hot spot as the pixels in the image that have a value within a threshold range of a value of the pixel determined to have a maximum temperature of the hot spot.

In an example, determination of the surrounding temperature comprises utilization of a number of at least one surrounding pixel in the image that is contiguous with the pixels in the image corresponding to the size of the hot spot and comprises utilization of at least one pixel value of the at least one surrounding pixel.

In an example, determination of the surrounding temperature comprises utilization of a number of at least one surrounding pixel in the image that is not contiguous with the pixels in the image corresponding to the size of the hot spot and comprises utilization of at least one pixel value of the at least one surrounding pixel.

In an example, the correction factor has a plurality of possible values. The value of the correction factor used in the determination of the corrected temperature for the hot spot is determined as a function of the number of pixels in the image corresponding to the size of the hot spot.

In other words, a hot spot size dependent correction algorithm is provided, that enables the error in hot spot temperature measurements to be reduced even when using low resolution infrared cameras.

In an example, the plurality of possible values of the correction factor are determined on the basis of a plurality of calibration images of one or more hot spots acquired by the camera and/or by one more cameras that are substantially the same as the camera, and are determined on the basis of one or more measured temperatures or reference temperatures for the one or more hot spots.

In an example, a thermocouple is utilized to provide the measured temperatures.

In an example, determination of the plurality of possible values of the correction factor comprises for each calibration image of the plurality of calibration images a determination of a number of pixels in the calibration image corresponding to a size of the hot spot. The determination of the plurality of possible values of the correction factor also comprises for each calibration image of the plurality of calibration images a determination of an average temperature for the hot spot in the calibration image comprising a utilization of pixel values of the pixels in the calibration image corresponding to the size of the hot spot and the number of pixels in the calibration image corresponding to a size of the hot spot. The determination of the plurality of possible values of the correction factor also comprises for each calibration image of the plurality of calibration images a determination of a surrounding temperature in the calibration image comprising utilization of at least one pixel in the calibration image different to the pixels in the calibration image corresponding to the size of the hot spot.

In an example, the pixels in the calibration image corresponding to the size of the hot spot comprises a pixel in the calibration image corresponding to a maximum temperature of the hot spot. The pixels in the calibration image corresponding to the size of the hot spot are determined as the pixels in the calibration image that have a value within a threshold range of a value of the pixel determined to have the maximum temperature of the hot spot in the calibration image.

In an example, the determination of the plurality of possible values of the correction factor comprises for each calibration image of the plurality of calibration images a determination of an error value. The determination comprises a calculation of a first value as the measured or reference temperature for the hot spot subtracted from the average temperature for the hot spot in the calibration image and comprises a calculation of a second value as the surrounding temperature for the hot spot in the calibration image subtracted from the average temperature for the hot spot in the calibration image. The error value is then determined as the ratio of the first value to the second value.

In an example, determination of the corrected temperature comprises a multiplication of the correction factor with a difference between the average temperature for the hot spot in the image and the surrounding temperature in the image, and comprises a subtraction of the resulting temperature difference from the average temperature for the hot spot in the image.

In an example, upon the processing unit receiving the image from the input unit and prior to any further processing, the processing unit is configured to transform the image into an interpolated image for further processing.

In this manner, the temperature error can be further decreased through an increase of the resolution of the raw image by interpolations methods, before the correction is applied.

In a second aspect, there is provided a system for hot spot sensing, the system comprising:
  an apparatus according to the first aspect; and
  a camera.

The camera is configured to acquire the image of an object that has a hot spot.

In a third aspect, there is provided a low voltage, medium voltage or high voltage switchgear, comprising at least one system according to second aspect. The object that has a hot spot is part of the switchgear.

In a fourth aspect, there is provided an method for hot spot sensing, the method comprising:
  b) providing a processing unit with an image of an object that has a hot spot, wherein image data of the image comprises image data of the hot spot, and wherein the image was acquired by a camera;
  e) determining by the processing unit a number of pixels in the image corresponding to a size of the hot spot;
  f) determining by the processing unit an average temperature for the hot spot, the determining comprising utilizing pixel values of the pixels in the image corresponding to the size of the hot spot and the number of pixels in the image corresponding to the size of the hot spot;
  g) determining by the processing unit a surrounding temperature in the image, the determining comprising utilizing at least one pixel in the image different to the pixels in the image corresponding to the size of the hot spot;
  h) determining by the processing unit a corrected temperature for the hot spot, the determining comprising utilizing a value of a correction factor, the average temperature for the hot spot and the surrounding temperature.

In an example, the method comprises step d) determining by the processing unit a pixel in the image corresponding to a maximum temperature of the hot spot, and wherein in step e) the pixels in the image corresponding to the size of the hot spot comprises the pixel in the image corresponding to the maximum temperature of the hot spot.

In an example, step e) comprises the processing unit determining the pixels in the image corresponding to the size of the hot spot as the pixels in the image that have a value within a threshold range of a value of the pixel determined to have a maximum temperature of the hot spot.

In an example, step g) comprises utilizing a number of at least one surrounding pixel in the image that is contiguous with the pixels in the image corresponding to the size of the hot spot and at least one pixel value of the at least one surrounding pixel.

In an example, step g) comprises utilizing a number of at least one surrounding pixel in the image that is not contiguous with the pixels in the image corresponding to the size of the hot spot and at least one pixel value of the at least one surrounding pixel.

In an example, in step h) the correction factor has a plurality of possible values, and wherein step h) comprises determining the value of the correction factor as a function of the number of pixels in the image corresponding to the size of the hot spot.

In an example, method comprises step a) determining the plurality of possible values of the correction factor on the basis of a plurality of calibration images of one or more hot spots acquired by the camera and/or by one more cameras that are substantially the same as the camera, and on the basis of one or more measured temperatures or reference temperatures for the one or more hot spots.

In an example, a thermocouple is utilized to provide the measured temperatures.

In an example, step a) comprises determining for each calibration image of the plurality of calibration images a number of pixels in the calibration image corresponding to a size of the hot spot, determining an average temperature for the hot spot in the calibration image comprising utilizing pixel values of the pixels in the calibration image corresponding to the size of the hot spot and the number of pixels in the calibration image corresponding to a size of the hot spot, and determining a surrounding temperature in the calibration image comprising utilizing at least one pixel in the calibration image different to the pixels in the calibration image corresponding to the hot spot.

In an example, in step a) the pixels in the calibration image corresponding to the size of the hot spot comprises a pixel in the calibration image corresponding to a maximum temperature of the hot spot, and wherein step a) comprises determining the pixels in the calibration image corresponding to the size of the hot spot as the pixels in the calibration image that have a value within a threshold range of a value of the pixel determined to have the maximum temperature of the hot spot in the calibration image.

In an example, step a) comprises determining for each calibration image of the plurality of calibration images an error value, the determining comprising calculating a first value as the measured or reference temperature for the hot spot subtracted from the average temperature for the hot spot in the calibration image and calculating a second value as the surrounding temperature for the hot spot in the calibration image subtracted from the average temperature for the hot spot in the calibration image, and wherein step a) comprises determining the error value as the ratio of the first value to the second value.

In an example, step h) comprises multiplying the correction factor with a difference between the average temperature for the hot spot in the image and the surrounding temperature in the image, and subtracting this from the average temperature for the hot spot in the image.

In an example, the method comprises step c) transforming by the processing unit the image into an interpolated image for further processing.

The above aspects and examples will become apparent from and be elucidated with reference to the embodiments described hereinafter.

DETAILED DESCRIPTION OF EMBODIMENTS

FIGS. 1-8 relate to the operation of an apparatus, a system and a method for hot spot sensing. In an example, an apparatus is provided for hot spot sensing. The apparatus comprises an input unit, a processing unit, and an output unit. The input unit is configured to provide the processing unit with an image of an object that has a hot spot. Image data of the image comprises image data of the hot spot, and the image was acquired by a camera. The processing unit is configured to determine a number of pixels in the image corresponding to a size of the hot spot. The processing unit is configured to determine the maximal temperature and an average temperature for the hot spot. The determination of the average temperature comprises utilization of pixel values of the pixels in the image corresponding to the size of the hot spot and comprises utilization of the number of pixels in the image corresponding to the size of the hot spot. The processing unit is configured to determine a surrounding temperature in the image. The determination of the surrounding temperature comprises utilization of at least one pixel in the image different to the pixels in the image corresponding to the size of the hot spot. The processing unit is configured to determine a corrected temperature for the hot spot. The determination of the corrected temperature comprises utilization of a value of a correction factor, comprises utilization of the average temperature for the hot spot and comprises utilization of the surrounding temperature.

The apparatus finds utility in applications where an infrared camera measurement device can be installed to measure the temperature of hot spots. Examples are for low voltage, medium voltage and high voltage switchgears.

In an example, the camera used to acquire the image is a low resolution camera. In an example, the camera has a sensor having 32×32 pixels. In an example, the camera has a sensor having 128×128 pixels. In an example, the camera has a sensor having 256×256 pixels. In an example, the camera has a sensor having 512×512 pixels. In an example, the camera has a sensor having 1024×1024 pixels.

In an example, the camera used to acquire the image operates in the long infrared range. In an example, the camera used to acquire the image operates in the 9-14 μm range.

According to an example, the processing unit is configured to determine a pixel in the image corresponding to a maximum temperature of the hot spot. The pixels in the image corresponding to the size of the hot spot comprises the pixel in the image corresponding to the maximum temperature of the hot spot.

According to an example, the processing unit is configured to determine the pixels in the image corresponding to the size of the hot spot as the pixels in the image that have a value within a threshold range of a value of the pixel determined to have a maximum temperature of the hot spot.

According to an example, determination of the surrounding temperature comprises utilization of a number of at least one surrounding pixel in the image that is contiguous with the pixels in the image corresponding to the size of the hot spot and comprises utilization of at least one pixel value of the at least one surrounding pixel.

According to an example, determination of the surrounding temperature comprises utilization of a number of at least one surrounding pixel in the image that is not contiguous with the pixels in the image corresponding to the size of the hot spot and comprises utilization of at least one pixel value of the at least one surrounding pixel.

According to an example, the correction factor has a plurality of possible values. The value of the correction factor used in the determination of the corrected temperature for the hot spot is determined as a function of the number of pixels in the image corresponding to the size of the hot spot.

According to an example, the plurality of possible values of the correction factor are determined on the basis of a plurality of calibration images of one or more hot spots acquired by the camera and/or by one or more cameras that are substantially the same as the camera, and are determined on the basis of one or more measured temperatures or reference temperatures for the one or more hot spots.

According to an example, a thermocouple is utilized to provide the measured temperatures.

According to an example, determination of the plurality of possible values of the correction factor comprises for each calibration image of the plurality of calibration images a determination of a number of pixels in the calibration image corresponding to a size of the hot spot. The determination of the plurality of possible values of the correction factor also comprises for each calibration image of the plurality of calibration images a determination of an average temperature for the hot spot in the calibration image comprising a utilization of pixel values of the pixels in the calibration image corresponding to the size of the hot spot and the number of pixels in the calibration image corresponding to a size of the hot spot. The determination of the plurality of possible values of the correction factor also comprises for each calibration image of the plurality of calibration images a determination of a surrounding temperature in the calibration image comprising utilization of at least one pixel in the calibration image different to the pixels in the calibration image corresponding to the size of the hot spot.

According to an example, the pixels in the calibration image corresponding to the size of the hot spot comprises a pixel in the calibration image corresponding to a maximum temperature of the hot spot. The pixels in the calibration image corresponding to the size of the hot spot are determined as the pixels in the calibration image that have a value within a threshold range of a value of the pixel determined to have the maximum temperature of the hot spot in the calibration image.

According to an example, the determination of the plurality of possible values of the correction factor comprises for each calibration image of the plurality of calibration images a determination of an error value. The determination comprises a calculation of a first value as the measured or reference temperature for the hot spot subtracted from the average temperature for the hot spot in the calibration image and comprises a calculation of a second value as the surrounding temperature for the hot spot in the calibration image subtracted from the average temperature for the hot spot in the calibration image. The error value is then determined as the ratio of the first value to the second value.

According to an example, determination of the corrected temperature comprises a multiplication of the correction factor with a difference between the average temperature for the hot spot in the image and the surrounding temperature in the image, and comprises a subtraction of the resulting temperature difference from the average temperature for the hot spot in the image.

According to an example, upon the processing unit receiving the image from the input unit and prior to any further processing, the processing unit is configured to transform the image into an interpolated image for further processing.

Thus, an apparatus can operate in an offline mode, where a camera acquires imagery that is then transferred to the apparatus that analyses that imagery to determine information relating to a hot spot as described above.

However, the apparatus can be linked to a camera, and thereby form a system that can acquire imagery and analyse that imagery in real time, and therefore provide an accurate quantification of hots spots in electrical equipment, such as a switchgear in real time.

As described, there is a workflow relating to the quantification of hot spots. Therefore, in an example there is provided an method for hot spot sensing, the method in its basic step comprising:

b) providing a processing unit with an image of an object that has a hot spot, wherein image data of the image comprises image data of the hot spot, and wherein the image was acquired by a camera;

e) determining by the processing unit a number of pixels in the image corresponding to a size of the hot spot;

f) determining by the processing unit an average temperature for the hot spot, the determining comprising utilizing pixel values of the pixels in the image corresponding to the size of the hot spot and the number of pixels in the image corresponding to the size of the hot spot;

g) determining by the processing unit a surrounding temperature in the image, the determining comprising utilizing at least one pixel in the image different to the pixels in the image corresponding to the size of the hot spot;

h) determining by the processing unit a corrected temperature for the hot spot, the determining comprising utilizing a value of a correction factor, the average temperature for the hot spot and the surrounding temperature.

According to an example, the method comprises step d) determining by the processing unit a pixel in the image corresponding to a maximum temperature of the hot spot, and wherein in step e) the pixels in the image corresponding to the size of the hot spot comprises the pixel in the image corresponding to the maximum temperature of the hot spot.

According to an example, step e) comprises the processing unit determining the pixels in the image corresponding to the size of the hot spot as the pixels in the image that have a value within a threshold range of a value of the pixel determined to have a maximum temperature of the hot spot.

According to an example, step g) comprises utilizing a number of at least one surrounding pixel in the image that is contiguous with the pixels in the image corresponding to the size of the hot spot and at least one pixel value of the at least one surrounding pixel.

According to an example, step g) comprises utilizing a number of at least one surrounding pixel in the image that is not contiguous with the pixels in the image corresponding to the size of the hot spot and at least one pixel value of the at least one surrounding pixel.

According to an example, in step h) the correction factor has a plurality of possible values, and wherein step h) comprises determining the value of the correction factor as a function of the number of pixels in the image corresponding to the size of the hot spot.

According to an example, method comprises step a) determining the plurality of possible values of the correction factor on the basis of a plurality of calibration images of one or more hot spots acquired by the camera and/or by one or more cameras that are substantially the same as the camera, and on the basis of one or more measured temperatures or reference temperatures for the one or more hot spots.

According to an example, a thermocouple is utilized to provide the measured temperatures.

According to an example, step a) comprises determining for each calibration image of the plurality of calibration images a number of pixels in the calibration image corresponding to a size of the hot spot, determining an average temperature for the hot spot in the calibration image comprising utilizing pixel values of the pixels in the calibration image corresponding to the size of the hot spot and the number of pixels in the calibration image corresponding to a size of the hot spot, and determining a surrounding temperature in the calibration image comprising utilizing at least one pixel in the calibration image different to the pixels in the calibration image corresponding to the hot spot.

According to an example, in step a) the pixels in the calibration image corresponding to the size of the hot spot comprises a pixel in the calibration image corresponding to a maximum temperature of the hot spot, and wherein step a) comprises determining the pixels in the calibration image corresponding to the size of the hot spot as the pixels in the calibration image that have a value within a threshold range of a value of the pixel determined to have the maximum temperature of the hot spot in the calibration image.

According to an example, step a) comprises determining for each calibration image of the plurality of calibration images an error value, the determining comprising calculating a first value as the measured or reference temperature for the hot spot subtracted from the average temperature for the hot spot in the calibration image and calculating a second value as the surrounding temperature for the hot spot in the calibration image subtracted from the average temperature for the hot spot in the calibration image, and wherein step a) comprises determining the error value as the ratio of the first value to the second value.

According to an example, step h) comprises multiplying the correction factor with a difference between the average temperature for the hot spot in the image and the surrounding temperature in the image, and subtracting this from the average temperature for the hot spot in the image.

According to an example, the method comprises step c) transforming by the processing unit the image into an interpolated image for further processing.

Thus, the above described apparatus, system and method addresses the issue of the accurate determination of a precise absolute temperature value for small hot spots that are detected by low-resolution IR camera, which would otherwise not be achievable with a low resolution camera but would require a high resolution and expensive IR camera.

The apparatus, system and method has overcome the following problems [1] The lower resolution makes it more difficult to distinguish between the temperature of the hot spot and of its background. A hot spot pixel with the maximal measured temperature may represent to some extent the temperature of the background. This effect is more pronounced, the higher the temperature difference becomes between hot spot and background. Thus, low-resolution IR cameras deliver a further reduced accuracy, especially for small hot spots in the vicinity of a cold background.

[2] The usage of wide-angle lens implies the fisheye effect for low-resolution IR cameras which means that equal-sized objects of same temperature are resolved by varying pixel numbers depending on their position in the image. The more the object is positioned away from the middle position, the less accurate the measured temperature becomes due to the reduced number of pixels.

[1] and [2] are characteristic for low-resolution IR cameras, and can normally only be mitigated by selecting high-quality high resolution IR cameras, which has until now made permanent installation unattractive. However, the currently described techniques enable low resolution cameras to be used effectively and cost effectively in permanently installed locations for monitoring electrical equipment.

As discussed above, the above problems have been solved by using a correction algorithm, which compensates for the temperature error for hot spots during an image processing step. The correction algorithm enables the accuracy of temperatures from low resolution IR cameras to be improved, and where further improvement in the accuracy is provided by applying interpolation methods.

Further detail on specific embodiments is now described, again with reference to FIGS. 1-8.

Temperature Correction Algorithm—Overview

In the situation when there are several hot spots in a global image, a partitioning algorithm segregates the measured image into component parts. Each part represents one independent hot spot. Below, a solution is explained for one hot spot.

The temperature correction algorithm consists of four steps, as shown in the flow chart in FIG. 1:

[1] Detection of image pixel with maximal temperature. The algorithm finds the image pixel showing the highest absolute temperature value.

[2] Determination of hot spot size and temperature. The hot spot size is determined by counting the image pixels which fulfil a predefined hot spot condition in the vicinity of maximal temperature. The mean value of all detected pixels gives the hot spot temperature.

[3] Determination of surrounding/background temperature. The higher the difference between surrounding/background and the hot spot temperature, the more has the algorithm to compensate.

[4] Correction function
 (a) Derivation—Measurements are performed to evaluate the hot spot size-dependent temperature error. The correction functions are derived by curve fitting of the error.
 (b) Application—The correction function of the algorithm gives the corrected hot spot temperature as output after steps [1]-[3].

Interpolation Methods—Overview

Interpolation methods can be applied on the raw images to reach a better spatial resolution of the hot spot area and size.

One or more solution may use low-resolution IR cameras for online temperature monitoring of hot spots, where the algorithm can be implemented in the micro-controller of the sensor or in the central data aggregation unit.

Temperature Sensing—In More Detail

Figure 2:
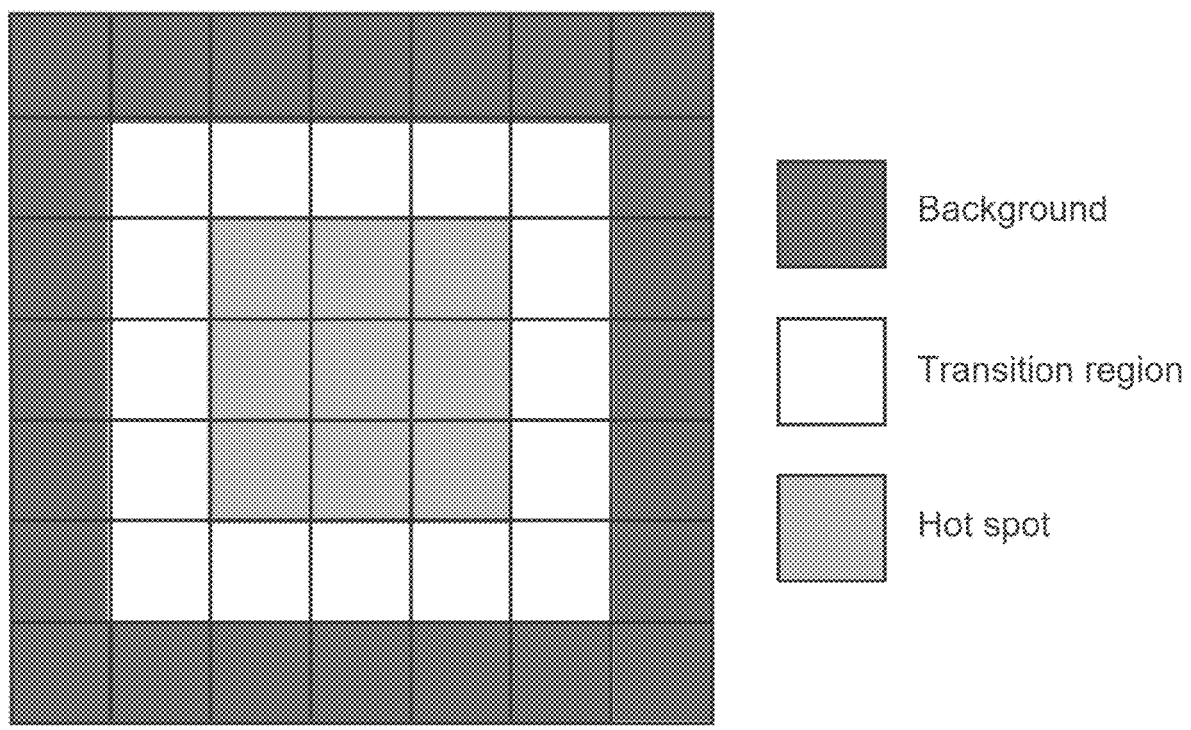
FIG. 2 shows an exemplar ideal hot spot.

FIG. 2 shows an ideal hot spot. In the middle of the image is the pixel with maximal temperature, but the hot spot definition also includes the neighbouring area of this pixel. Influence of hot spot is obvious in the transition region while the background remains unaffected. It has been established that the maximal temperature is in good agreement with the real temperature for hot spot pixel numbers $N \geq 9$, where N is the total number of detected hot spot pixels. Therefore, the amount of correction reduces for $N \geq 9$ in the derived correction functions. In FIG. 2, the pixel, representing the maximal temperature, is surrounded by pixels with about the same temperature. This is the ideal case. The distribution of the hot spot pixels can also be taken into account for an error compensation, but can remain unconsidered for the sake of simplicity. Thus, in the following in addition to providing an compensation function that varies as a function of the number of pixels in the hot spot, with additional experimental data the compensation function can be determined taking into account the distributions of the hot spot pixels.

Figure 3A:
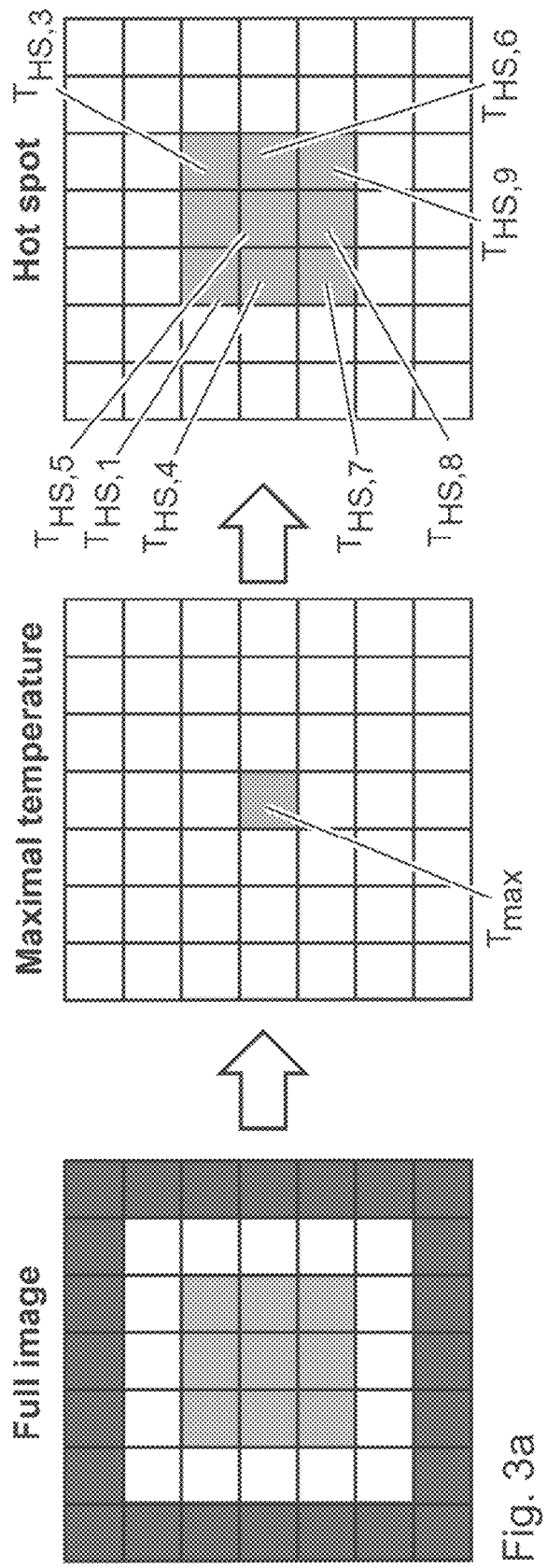
FIG. 3a-b show examples of hot spot determination, for an ideal case in a) and for an non-ideal case in b)
Figure 3B:
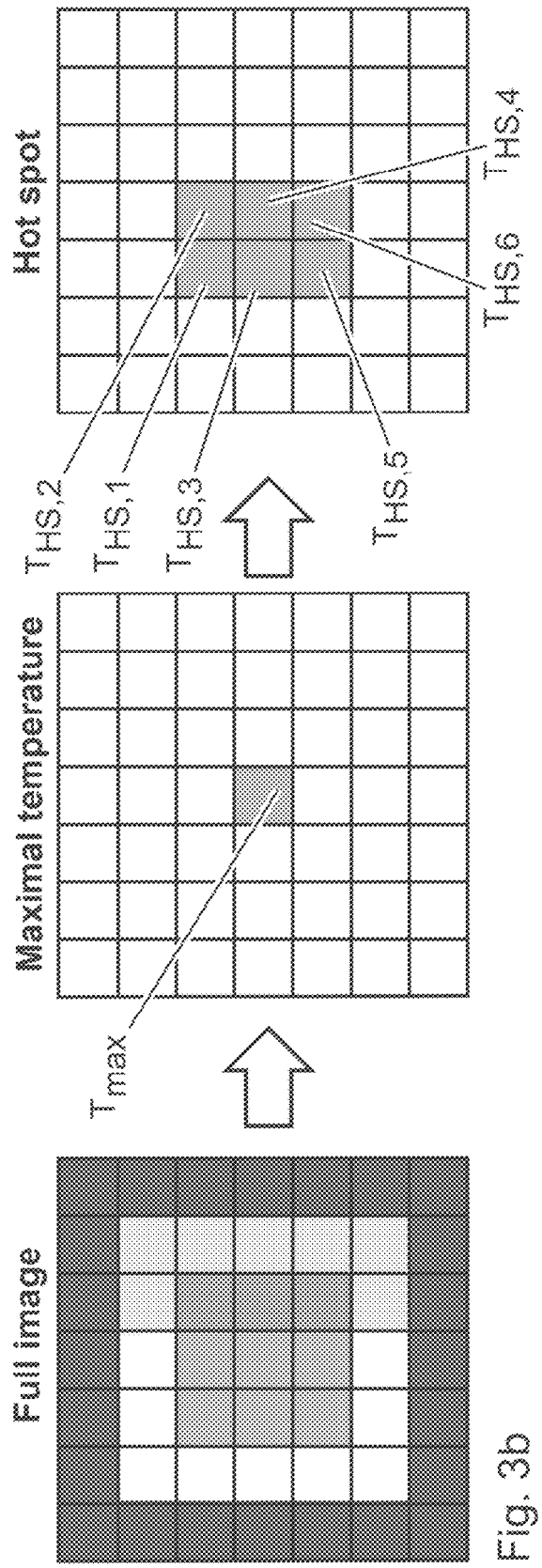

FIG. 3 outlines schematically the determination of a hot spot for the ideal and non-ideal case:

1. The first step is to identify the pixel with the maximal temperature $T_{max}$ for the full image. Here, this full image only represents a hot spot which can be already segregated from a larger image as mentioned before.

2. A hot spot condition is defined to detect all image pixels which belong to the hot spot, for instance $$T_{HS,i} > (1-p)T_{max}$$

where the small parameter p gives the maximal deviation from the maximal temperature $T_{max}$. The temperature $T_{HS,i}$ refers to the hot spot pixel with index i. In medium voltage (MV) switchgears, typical values of p are chosen to be about 0.05. This means that all pixels with maximal 5% difference to $T_{max}$ enclose a connected hot spot. In the ideal case, the pixel with $T_{max}$ is in the hot spot centre since it is the most likely to remain unaffected by the surrounding. However, if one of the neighbouring pixels of the $T_{max}$ pixel does not fulfil the hot spot condition, a temperature correction will be useful to get a more accurate temperature measurement.

3. By applying the hot spot conditions, all hot spot pixels $T_{HS,i}$ can be detected with i=1 . . . N where N denotes the total number of hot spot pixels. Then, the hot spot temperature $T_{HS}$ follows from the average temperature of all detected pixels $$T_{HS} = \Sigma_{i=1}^{N} T_{HS,i}/N$$

for which $T_{HS} \leq T_{max}$ holds.

4. Finally, the number N as well as the average temperature $T_{HS}$ describes the hot spot in size and temperature.

For the evaluation of the surrounding temperature, two cases are distinguished. The first approach considers the background temperature, which is uninfluenced by the hot spot. The second approach focuses on the temperature in the immediate (or contiguous) region surrounding of the detected pixel with the maximal temperature.

Figure 4:
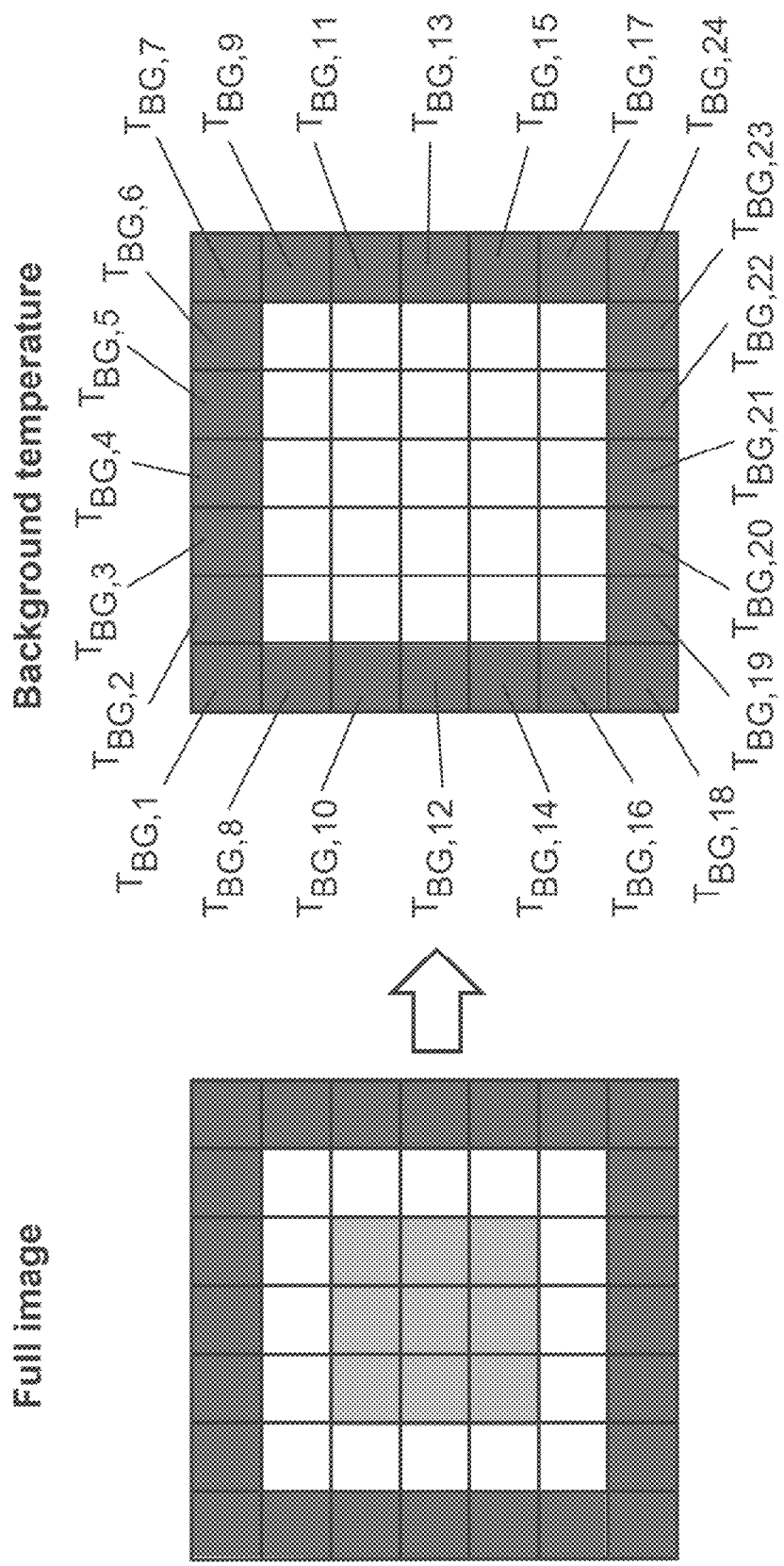
FIG. 4 shows an approach for evaluation of a surrounding temperature.

FIG. 4 depicts schematically the evaluation of the background temperature:

1. The background temperature is represented by the image pixels which are in close proximity to the hot spot, but are unaffected. Thus, the background area encloses a connected border around the hot spot for determination of the background temperature.

2. The average temperature $T_{BG}$ of the background is given by $$T_{BG} = \Sigma_{i=1}^{N_{BG}} T_{BG,i}/N_{BG}$$

where $N_{BG}$ is the number of all detected pixels and $T_{BG,i}$ refers to the temperature of the pixel i in the background area.

3. The average background temperature $T_{BG}$ is used in the correction functions to consider the influence on the hot spot temperature.

Figure 5:
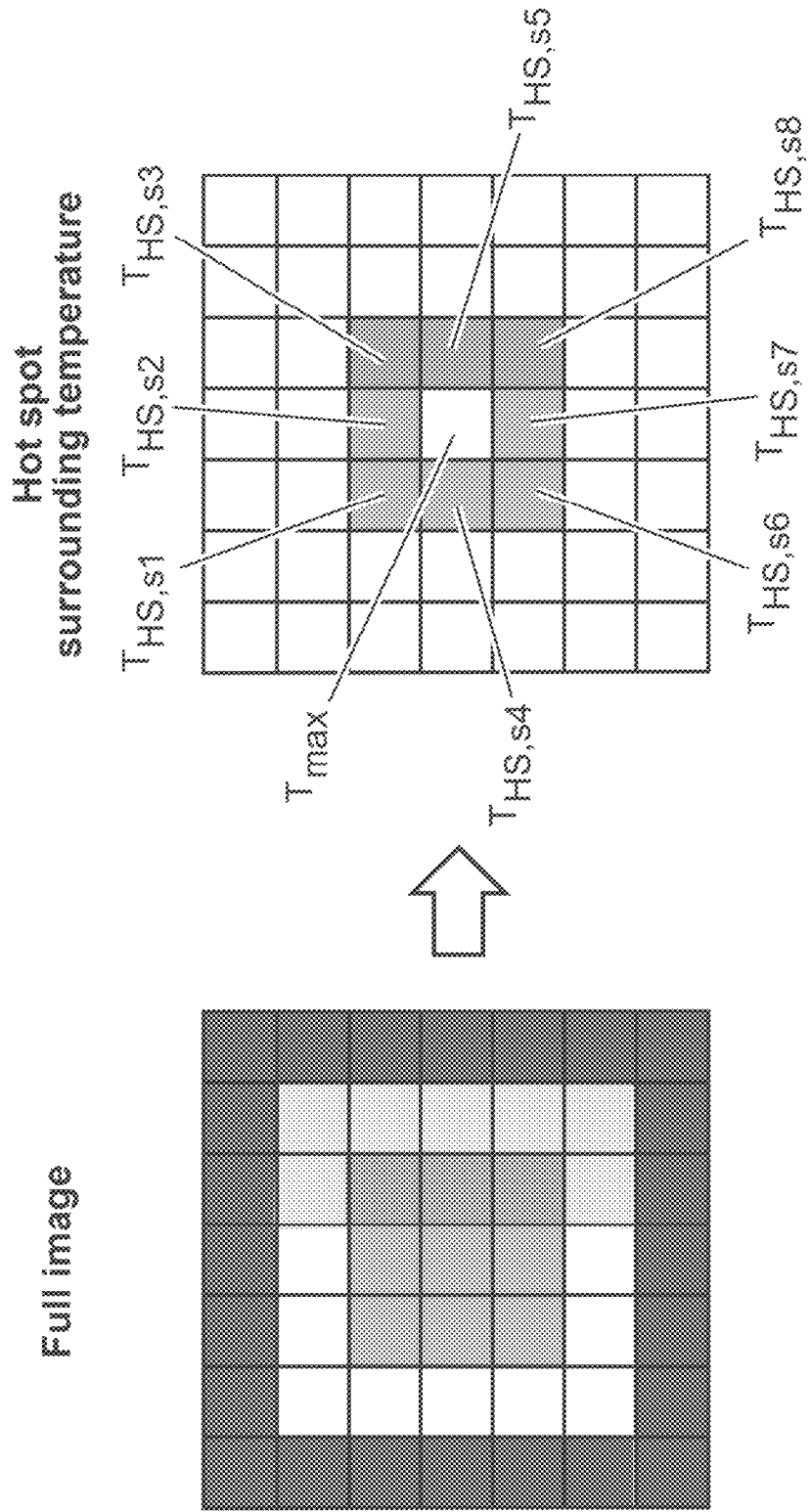
FIG. 5 shows an approach for evaluation of a surrounding temperature.
Figure 6:
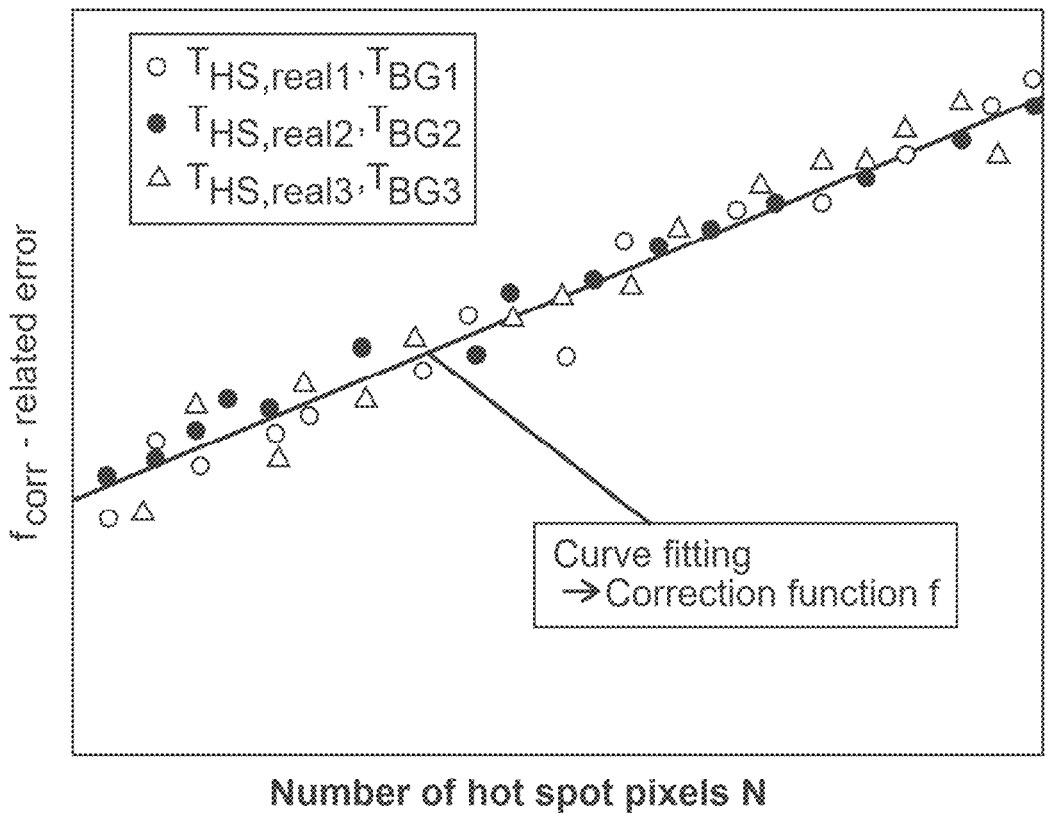
FIG. 6 shows an example of correction function as a function of the number of pixels in hot spots.

It has been established that the influence of surrounding temperature can be also estimated in the close proximity of the hot spot. In this approach, the surrounding temperature is affected by the hot spot and the difference to the maximal measured temperature gives a quantity relating to how accurate the measurement of the hot spot temperature is. If the difference goes to zero, the hot spot surrounding temperature coincides more and more with the maximal temperature and the error becomes negligible. FIG. 5 shows qualitatively the determination of the hot spot surrounding temperature $T_{HS,s}$:

1. The eight image pixels around the pixel with maximal temperature yield the surrounding temperature $T_{HS,s}$ of the hot spot.

2. The hot spot surrounding temperature $T_{HS,s}$ can be determined by $$T_{HS,s} = \Sigma_{i=1}^{8} T_{HS,si}/8$$

where $T_{HS,si}$ is the temperature of the pixel i in the neighbouring area of the pixel with maximal temperature.

3. In the correction functions, the hot spot surrounding temperature $T_{HS,s}$ represents the amount of correction, which is needed due to the difference of maximal temperature and its immediate surrounding.

The correction functions are the core of the algorithm, which describe the hot spot size dependent error in temperature measured by the infrared camera. They can be derived from reference or basic measurements where thermocouples are additionally installed for the sake of comparison. With the purpose of generally valid correction functions, it is convenient to vary additionally the object (hot spot) and background temperature:

1. The maximal temperature $T_{max}$ or the hot spot temperature $T_{HS}$ can be taken as measured hot spot temperature $T_{HS,meas}$ to derive the correction functions. Note that the temperature correction algorithm should be applied for the same choice of measured temperature.

2. The error between real temperature $T_{HS,real}$ and measured temperature $T_{HS,meas}$ can be written as $$T_{HS,meas} - T_{HS,real} = f_{corr}(N)(T_{HS,meas} - T_{SR})$$

where $f_{corr}$ describes the correction function dependent on the number N of hot spot pixels. The correction function $f_{corr}$ is additionally multiplied with the difference of $T_{HS,meas}$ and $T_{SR}$ to take into account the effect of surrounding temperature on the hot spot temperature.

3. Two approaches are introduced to consider the surrounding of the hot spot which lead to different correction functions f corr. The surrounding temperature $T_{SR}$ can be represented by the background temperature $T_{SR}=T_{BG}$ or by the hot spot surrounding temperature $T_{SR}=T_{HS,s}$.

However, the background temperature can be controlled in the measurements for the derivation of the correction functions. The resulting hot spot surrounding temperature is implicitly dependent on the background temperature.

4. By evaluating the measurements, the correction function $f_{corr}$ can be plotted against the number N for different hot spot and surrounding temperatures. Curve fitting is performed to have a global mathematical function which reveals the best fit of the measured errors in dependence on N for the considered range of hot spot and surrounding temperatures, see FIG. 6. that shows measurement errors against number N of hot spot pixels and correction function, here as a linear function from a curve fitting. The different types of points represent measurements with different hot spot and background temperatures.

The last step of the temperature correction algorithm is to calculate the corrected temperature:

As explained above, correction functions $f_{corr}$ can be provided, which actually results from a curve fitting of the error. A corrected temperature can then be calculated directly from $$T_{corr} = T_{HS,meas} - f_{corr}(N)(T_{HS,meas} - T_{SR})$$

if the measured hot spot $T_{HS,meas}$ and surrounding temperature $T_{SR}$ as well as the number N of hot spot pixels are known from the steps before.

Thus in this manner, the above described technique of temperature correction allows to improve the accuracy of hot spot temperature detection at a very low cost as only the simple algorithm has to be implemented in the micro controller of the sensor or in the central data aggregation unit. Neither additional complex optics is needed, nor a high-quality IR camera with better or high resolution.

Figure 7:
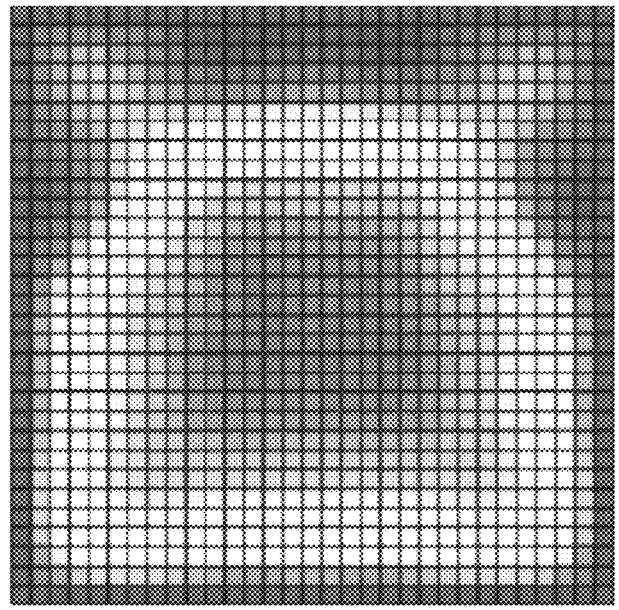
FIG. 7 shows an example of spline interpolation of a non-ideal hot spot.
Figure 7:
Figure 7:
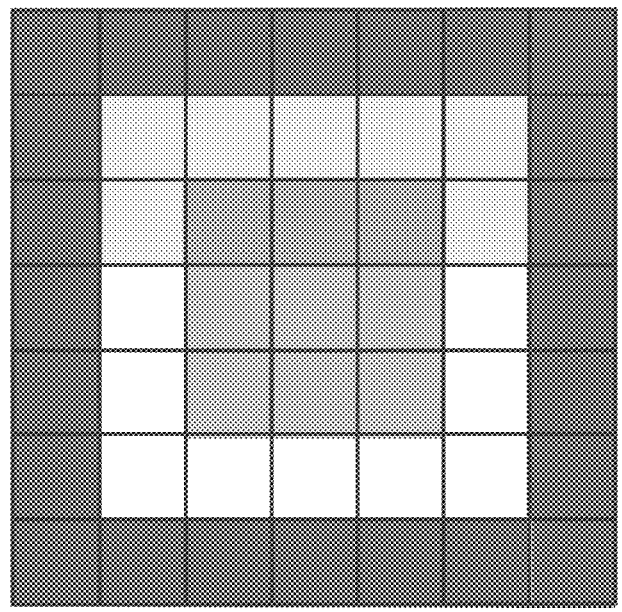

Interpolation methods can be used to increase image quality. FIG. 7 shows an exemplary spline interpolation for the non-ideal hot spot.

Figure 8:
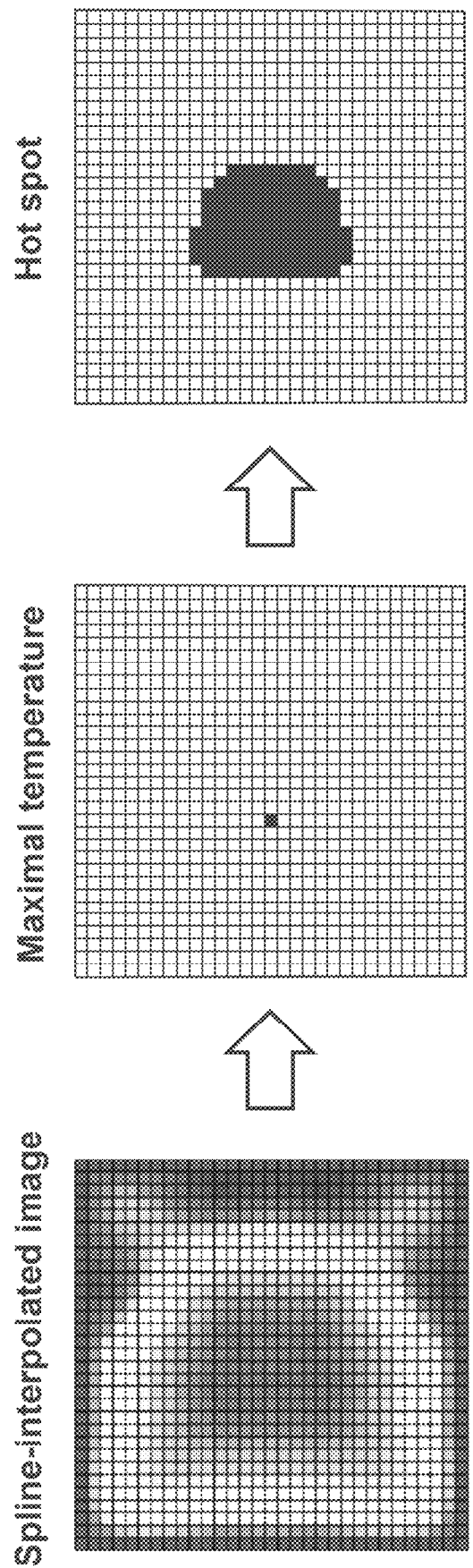
FIG. 8 shows an example of hot spot determination for the spline interpolated image of FIG. 7.

As outlined in FIG. 8, interpolation increases the resolution of the image, which improves the characterization of the hot spot size and temperature as well as the surrounding/background temperature compared to the raw image in FIG. 2 b).

The application of interpolation methods is useful for the derivation of correction functions as well as for the temperature correction algorithm itself. In both cases, the interpolation is carried out beforehand and all further steps are proceeded with the interpolated image of better quality.

Interpolation results in smooth linear functions between data points in each pixel of the raw image. Indeed, discontinuities, for example caused by a warm cable running through the cold background, can be only captured by the thermal image at the borders of the raw image pixels. In general, interpolation does not support to detect the exact boundaries of discontinuity in the raw image.

The main benefit is that the interpolation leads to more accurate results. Especially, the temperature correction algorithm becomes less sensitive to changes in the number of hot spot pixels, which reduces oscillatory behaviour during an online temperature monitoring.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An apparatus for hot spot sensing, the apparatus comprising:
    an input unit;
    a processing unit; and
    an output unit;
    wherein the input unit is configured to provide the processing unit with an image of an object that comprises a hot spot, wherein image data of the image comprises image data of the hot spot, and wherein the image was acquired by a camera,
    wherein, the processing unit is configured to determine a number of pixels in the image corresponding to a size of the hot spot,
    wherein, the processing unit is configured to determine an average temperature for the hot spot, the determination comprising utilization of pixel values of the pixels in the image corresponding to the size of the hot spot and the number of pixels in the image corresponding to the size of the hot spot,
    wherein the processing unit is configured to determine a surrounding temperature in the image, the determination comprising utilization of at least one pixel in the image different to the pixels in the image corresponding to the size of the hot spot,
    wherein the processing unit is configured to determine a corrected temperature for the hot spot, the determination comprising utilization of a value of a correction factor, the average temperature for the hot spot and the surrounding temperature, and
    wherein determination of the corrected temperature comprises a multiplication of the correction factor with a difference between the average temperature for the hot spot in the image and the surrounding temperature in the image, and a subtraction of this from the average temperature for the hot spot in the image.

2. The apparatus according to claim 1, wherein the processing unit is configured to determine a pixel in the image corresponding to a maximum temperature of the hot spot, and wherein the pixels in the image corresponding to the size of the hot spot comprises the pixel in the image corresponding to the maximum temperature of the hot spot.

3. The apparatus according to claim 2, wherein the processing unit is configured to determine the pixels in the image corresponding to the size of the hot spot as the pixels in the image that comprise a value within a threshold range of a value of the pixel determined to comprise a maximum temperature of the hot spot.

4. The apparatus according to claim 3, wherein determination of the surrounding temperature comprises utilization of a number of at least one surrounding pixel in the image that is not contiguous with the pixels in the image corresponding to the size of the hot spot and at least one pixel value of the at least one surrounding pixel.

5. The apparatus according to claim 1, wherein determination of the surrounding temperature comprises utilization of a number of at least one surrounding pixel in the image that is contiguous with the pixels in the image corresponding to the size of the hot spot and at least one pixel value of the at least one surrounding pixel.

6. The apparatus according to claim 1, wherein the correction factor comprises a plurality of possible values, and wherein the value of the correction factor used in the determination of the corrected temperature for the hot spot is determined as a function of the number of pixels in the image corresponding to the size of the hot spot.

7. The apparatus according to claim 6, wherein the plurality of possible values of the correction factor are determined on the basis of a plurality of calibration images of one or more hot spots acquired by the camera and/or by one more cameras that are substantially the same as the camera, and on the basis of one or more measured temperatures or reference temperatures for the one or more hot spots.

8. The apparatus according to claim 7, wherein a thermocouple is utilized to provide the measured temperatures.

9. The apparatus according to claim 7, wherein determination of the plurality of possible values of the correction factor comprises for each calibration image of the plurality of calibration images a determination of a number of pixels in the calibration image corresponding to a size of the hot spot, a determination of an average temperature for the hot spot in the calibration image comprising a utilization of pixel values of the pixels in the calibration image corresponding to the size of the hot spot and the number of pixels in the calibration image corresponding to a size of the hot spot, and a determination of a surrounding temperature in the calibration image comprising utilization of at least one pixel in the calibration image different to the pixels in the calibration image corresponding to the size of the hot spot.

10. The apparatus according to claim 9, wherein the pixels in the calibration image corresponding to the size of the hot spot comprises a pixel in the calibration image corresponding to a maximum temperature of the hot spot, and wherein the pixels in the calibration image corresponding to the size of the hot spot are determined as the pixels in the calibration image that comprise a value within a threshold range of a value of the pixel determined to comprise the maximum temperature of the hot spot in the calibration image.

11. The apparatus according to claim 8, wherein the determination of the plurality of possible values of the correction factor comprises for each calibration image of the plurality of calibration images a determination of an error value, the determination comprising a calculation of a first value as the measured or reference temperature for the hot spot subtracted from the average temperature for the hot spot in the calibration image and a calculation of a second value as the surrounding temperature for the hot spot in the calibration image subtracted from the average temperature for the hot spot in the calibration image, and wherein the error value is determined as the ratio of the first value to the second value.

12. The apparatus according to claim 1, wherein upon the processing unit receiving the image from the input unit and prior to any further processing, the processing unit is configured to transform the image into an interpolated image for further processing.

13. A system for hot spot sensing, the system comprising:
the apparatus according to claim 1; and
the camera,
wherein the camera is configured to acquire the image of the object that comprises a hot spot.

14. A low voltage, medium voltage or high voltage switchgear, comprising at least one system according to claim 13, wherein the object that comprises the hot spot is part of the switchgear.

15. A method for hot spot sensing, the method comprising:
b) providing a processing unit with an image of an object that comprises a hot spot, wherein image data of the image comprises image data of the hot spot, and wherein the image was acquired by a camera;
e) determining by the processing unit a number of pixels in the image corresponding to a size of the hot spot;
f) determining by the processing unit an average temperature for the hot spot, the determining comprising utilizing pixel values of the pixels in the image corresponding to the size of the hot spot and the number of pixels in the image corresponding to the size of the hot spot;
g) determining by the processing unit a surrounding temperature in the image, the determining comprising utilizing at least one pixel in the image different to the pixels in the image corresponding to the size of the hot spot; and
h) determining by the processing unit a corrected temperature for the hot spot, the determining comprising utilizing a value of a correction factor, the average temperature for the hot spot and the surrounding temperature, further comprising:
multiplying the correction factor with a difference between the average temperature for the hot spot and the surrounding temperature in the image, and
subtracting the product from the average temperature for the hot spot in the image.

16. The method according to claim 15, wherein the method further comprises step d) determining by the processing unit a pixel in the image corresponding to a maximum temperature of the hot spot, and wherein in step e) the pixels in the image corresponding to the size of the hot spot comprises the pixel in the image corresponding to the maximum temperature of the hot spot.

17. The method according to claim 16, wherein step e) further comprises the processing unit determining the pixels in the image corresponding to the size of the hot spot as the pixels in the image that comprise a value within a threshold range of a value of the pixel determined to comprise a maximum temperature of the hot spot.

18. The method according to claim 15, wherein step g) further comprises utilizing a number of at least one surrounding pixel in the image that is contiguous with the pixels in the image corresponding to the size of the hot spot and at least one pixel value of the at least one surrounding pixel.

19. The method according to claim 15, wherein step g) further comprises utilizing a number of at least one surrounding pixel in the image that is not contiguous with the pixels in the image corresponding to the size of the hot spot and at least one pixel value of the at least one surrounding pixel.

20. The method according to claim 15, wherein in step h) the correction factor comprises a plurality of possible values, and wherein step h) further comprises determining the value of the correction factor as a function of the number of pixels in the image corresponding to the size of the hot spot.

21. The method according to claim 20, wherein method further comprises step a) determining the plurality of possible values of the correction factor on the basis of a plurality of calibration images of one or more hot spots acquired by the camera and/or by one more cameras that are substantially the same as the camera, and on the basis of one or more measured temperatures or reference temperatures for the one or more hot spots.

22. The method according to claim 21, wherein a thermocouple is utilized to provide the measured temperatures.

23. The method according to claim 21, wherein step a) further comprises:
determining for each calibration image of the plurality of calibration images a number of pixels in the calibration image corresponding to a size of the hot spot;
determining an average temperature for the hot spot in the calibration image comprising utilizing pixel values of the pixels in the calibration image corresponding to the size of the hot spot and the number of pixels in the calibration image corresponding to a size of the hot spot; and determining a surrounding temperature in the calibration image comprising utilizing at least one pixel in the calibration image different to the pixels in the calibration image corresponding to the hot spot.

24. The method according to claim 23, wherein:

in step a) the pixels in the calibration image corresponding to the size of the hot spot comprises a pixel in the calibration image corresponding to a maximum temperature of the hot spot, and step a) further comprises determining the pixels in the calibration image corresponding to the size of the hot spot as the pixels in the calibration image that comprise a value within a threshold range of a value of the pixel determined to comprise the maximum temperature of the hot spot in the calibration image.

25. The method according to claim 21, wherein step a) further comprises:

determining for each calibration image of the plurality of calibration images an error value, the determining comprising calculating a first value as the measured or reference temperature for the hot spot subtracted from the average temperature for the hot spot in the calibration image and calculating a second value as the surrounding temperature for the hot spot in the calibration image subtracted from the average temperature for the hot spot in the calibration image; and determining the error value as the ratio of the first value to the second value.

26. The method according to claim 15, wherein the method further comprises step c) transforming by the processing unit the image into an interpolated image for further processing.

* * * * *